April 14, 1970     J. A. HOLLY     3,506,019

SUBDIVIDED MEAT MIXER AND GRINDER

Filed Dec. 8, 1967     2 Sheets-Sheet 1

INVENTOR.
JAMES A. HOLLY

BY Hofgren, Wegner, Allen, Stillman & McCord

ATTORNEYS.

April 14, 1970  J. A. HOLLY  3,506,019
SUBDIVIDED MEAT MIXER AND GRINDER
Filed Dec. 8, 1967  2 Sheets-Sheet 2

United States Patent Office 3,506,019
Patented Apr. 14, 1970

3,506,019
SUBDIVIDED MEAT MIXER AND GRINDER
James A. Holly, Olympia Fields, Ill., assignor to Hollymatic Corporation, a corporation of Delaware
Filed Dec. 8, 1967, Ser. No. 689,066
Int. Cl. B01f 7/04
U.S. Cl. 259—46        15 Claims

ABSTRACT OF THE DISCLOSURE

An apparatus for mixing subdivided meat comprising a mixing chamber for retaining the meat during mixing, a rotatable shaft means in the chamber above the lower portion of the chamber and a plurality of spaced paddle means on the shaft rotatable in spaced paths with each paddle means including a blade movable through the chamber and having a narrow width to clear a path through the meat during the mixing and in which at least one blade is inclined to its direction of movement in order to mix the meat and simultaneously urge the meat toward another of the plurality of paddle means for thorough mixing.

---

This invention relates to mixing and grinding apparatus and, in particular, to apparatus for mixing and grinding meat.

In grinding meat to produce products such as hamburger, it has been found desirable to effect sequentially a rough grinding thereof, a thorough mixing of the rough ground meat, and a subsequent final grinding of the mixed, roughly ground meat to the desired consistency. Because of the relatively adherent characteristics of such meat, it has been difficult to provide a proper mixing of the rough ground meat without undue packing or kneading. Further, it has been difficult to deliver the mixed meat freely to the final grinding means. Another problem encountered in the known meat mixing and grinding apparatuses is the difficulty of maintaining cleanliness of the apparatus which requires ready separability of the mixing and grinding means.

One of the features of this invention therefore is to provide an improved apparatus for mixing subdivided meat efficiently and quickly without damage thereto and preferably for moving the meat into a grinding mechanism from the mixing chamber.

Other features and advantages of the invention will be apparent from the following description taken in connection with the accompanying drawing wherein:

FIGURE 5 is a fragmentary enlarged diametric section of the paddle shaft means illustrating the contractible mounting means providing for facilitated removal thereof when desired.

FIGURE 6 is a fragmentary vertical section illustrating a modified form of center paddle structure embodying the invention for use in the mixing apparatus.

FIGURE 7 is a fragmentary diametric section of the paddle shaft means showing a modified form of contractible means embodying the invention.

Figure 1:
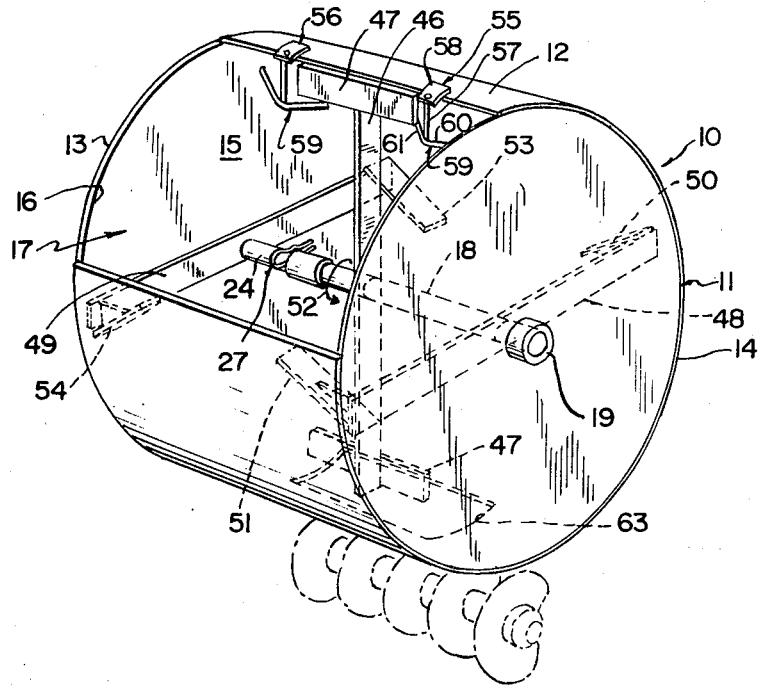
FIGURE 1 is a perspective view of an apparatus for mixing meat embodying the invention with a grinding means screw shown in dotted lines.

In the exemplary embodiment of the invention as disclosed in FIGURES 1 through 5 of the drawings, an apparatus generally designated 10 for mixing meat is shown to comprise a drum 11 formed of a suitable material such as sheet metal and having a tubular body portion 12, a left end wall 13 and a right end wall 14 defining a cylindrical mixing space 15. Access to space 15 is provided through an arcuate opening 16 in the upper portion of the drum for introduction of roughly chopped meat to be mixed in the apparatus 10.

Figure 2:
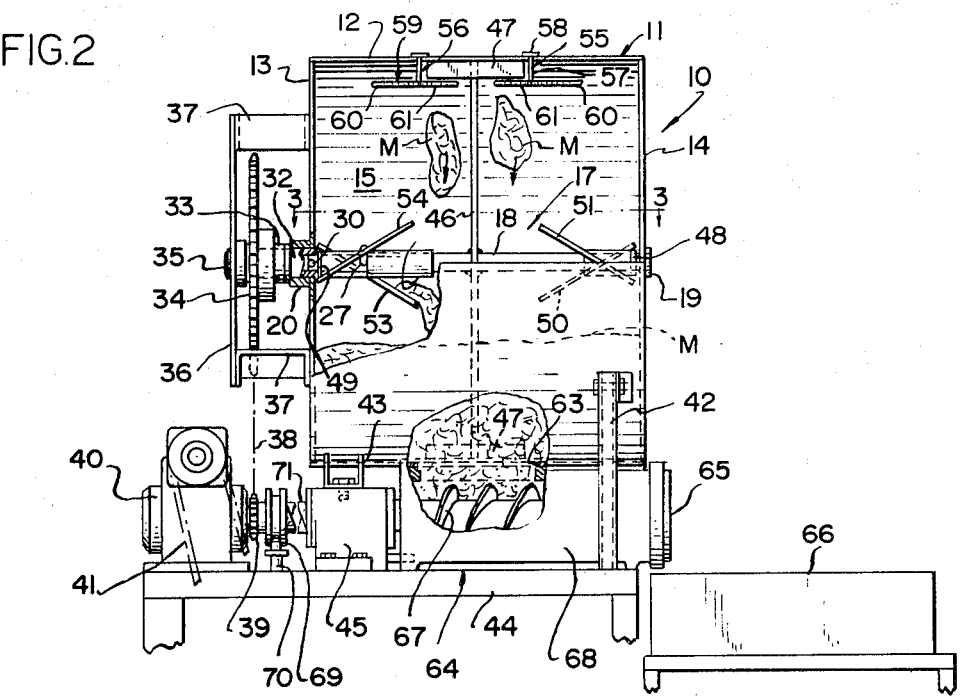
FIGURE 2 is a fragmentary front elevation of the apparatus with portions broken away to facilitate illustration of the invention.
Figure 3:
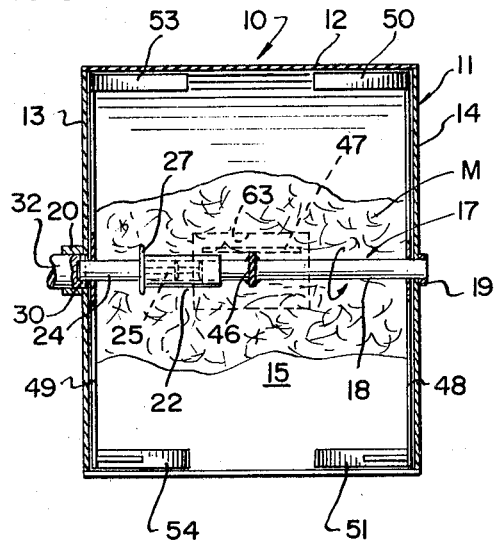
FIGURE 3 is a fragmentary horizontal section taken substantially along the line 3—3 of FIGURE 2.
Figure 4:
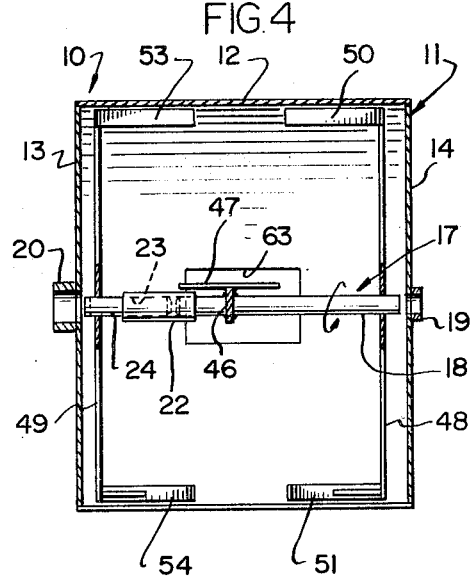
FIGURE 4 is a fragmentary horizontal section similar to that of FIGURE 3, but with the paddle shaft means arranged for removal from the mixing drum.

Mixing of the meat in the chamber, or space 15, is effected by means of a paddle structure generally designated 17 including a shaft 18 rotatably journalled in a bearing 19 carried at the center of end wall 14 and a bearing 20 carried at the center of end wall 13. The shaft 18 is contractible, as shown in FIGURE 5, to permit the left-hand end 21 to be moved away from end wall 13 thereby to permit removal of the paddle structure 17 through the drum opening 16 as for cleaning of the paddle structure when desired. Thus, as shown in FIGURE 5, the shaft 18 includes a sleeve 22 defining a socket 23 in which a stub shaft 24 comprising the left-hand end of shaft 18 is axially slidably received. The stub shaft 24 is secured against rotation relative to the sleeve 22 by a suitable key 25 carried on the stub shaft and received in a key slot 26 in the sleeve 22. The stub shaft is normally retained in the extended position of FIGURE 5 by a conventional cotter pin 27 having one leg received in a diametric hole 28 whereby the diametric groove 29 in the outer end 21 of the stub shaft 24 receives and is interlocked with a cross pin 30 extending diametrically across a recess 31 in the end 32 of a drive shaft 33. As shown in FIGURE 2, the drive shaft 33 carries a sprocket 34 and has its outboard end 35 journalled on a plate 36 mounted on the drum side wall 13 by suitable brackets 37. The sprocket 34 is driven by a suitable belt 38 from a driver sprocket 39 driven by a gear reduction unit 40, in turn driven through a suitable belt 41 from a suitable motor drive (not shown). Thus, rotation of sprocket 34 effects coaxial rotation of shaft 18 about the central axis of the drum 11. The drum is mounted on suitable supports 42 and 43. Support 42 is mounted directly on a base 44, and support 43 is carried on a bearing 45, in turn mounted on the base 44.

As discussed above, roughly chopped meat is mixed in chamber 15 by a paddle structure 17 carried by the shaft 18. More specifically, as best seen in FIGURE 1, the paddle structure 17 includes a first mounting bar 46 secured to the shaft 18 at the axial center of space 15 and provided at its opposite ends with paddle blades 47 which extend parallel to the axis of the shaft 18 transversely to the diametrically arranged bar 46. As shown in FIGURE 1, the paddle blades 47 extend generally axially relative to the cylindrical drum wall 12.

A pair of outer paddles are mounted at the opposite ends of the shaft 18 on support bars 48 and 49 respectively. Thus, support bar 48 is provided with a pair of paddle blades 50 and 51 inclined rearwardly at about 45° to the direction of rotation of the shaft 18 shown by the arrow 52 in FIGURE 1, and projecting inwardly, or to the left, from the suport bar 48 as seen in FIGURES 1 and 2. A corresponding pair of paddle blades 53 and 54 is mounted on the support bar 49 to project inwardly (to the right as seen in FIGURES 1 and 2) and rearwardly at about 45° to the direction of rotation of the shaft 18. As shown, the support bar 49 is fixed to the stub shaft 24 which effectively defines the left-hand end of the contractible shaft 18.

The rearward inclination of the paddle blades 50, 51, 53 and 54 tends to cause meat picked up by the paddles in the lower portion of the chamber 15 to fall therefrom toward the axial center of the chamber 15 when the meat falls from the paddles in the upper portion of their rotational movement. As shown in FIGURE 2, a quantity of meat M may be provided in the lower portion of the chamber 15 to have portions thereof engaged by the paddles as they move through the lower portion and lifted to the upper portion to fall onto the meat remaining in the lower portion. Lumps of meat will also be broken up in the embodiment shown by falling onto the rotating shaft 18.

To provide further improved mixing of the meat, stripper members 55 and 56 are mounted on the upper portion of the drum to be disposed slightly inwardly of the path of movement of the paddle blades whereby meat adhering to the paddle blades is stripped therefrom as the blades pass the stripper members. As shown in FIGURE 1, each stripper member includes a depending support 57 secured to the drum by a bracket 58 and carrying at the lower end a V-shaped element 59 including a right-hand rearwardly angled portion 60 and a left-hand rearwardly angled portion 61, the rearward angular direction being related to the direction of movement of the paddle blades therepast. Thus, as shown in FIGURE 2, illustratively, when the center paddle blades 47 are at the top of the drum 11 they pass closely outwardly adjacent the inner portions 61 of the stripper members 55 and 56 and cause meat clinging to the blades 47 to be stripped therefrom and fall downwardly onto the shaft 18 and onto the meat M in the lower portion of the drum. The action of the stripper members on the meat adhering to the paddle blades further causes the meat to tumble as it falls, thus effecting further improved mixing.

As the stripper member portions 61 are directed angularly rearwardly, they provide an axially outward urging of the meat to direct it somewhat toward the path of movement of the outer paddles, thereby providing an improved mixing action. Similarly, when the paddle blades 50, 51, 53 and 54 are disposed at the top of the drum, meat hanging therefrom is stripped therefrom by contact with the outer stripping member portions 60 to fall back onto the shaft 18 and the mass of meat in the lower portion of the drum, and because of the rearward inclination of the outer stripper member portions, the meat is directed somewhat toward the path of the center paddles.

Thus, the stripper members cooperate with each paddle blade to urge the stripped meat out of the path of the particular paddle blade to which it adhered, thereby to provide a further improved mixing of the meat in the drum. The paddle blades clear a path through the mass of meat M in the lower portion of the drum while tending to break up the mass into smaller portions. The inclined arrangement of the paddle blades 50, 51, 53 and 54 not only lifts the meat upwardly to fall back onto the shaft 18 and subjacent mass M, but also provides a movement of the meat toward the center of the drum for improved mixing. The stripper members cooperate with the respective paddle blades to further cause a longitudinal movement of the meat providing further improved mixing in the drum. As the stripper members 55 and 56 are mounted at the top of the drum, they are located substantially directly above the shaft 18 so that the meat falling therefrom tends to fall onto the shaft for further breaking up of the clumps and providing further facilitated mixing of the meat.

The drum wall 12 is further provided with a bottom opening 63 through which the mixed meat is delivered to the subjacent grinder generally designated 64. The grinder is provided with a grinder head outlet 65 from which the meat is discharged into a suitable collecting pan 66. The grinder includes a suitable feed screw 67 rotatably driven in a housing 68 by the gear box 41 through a clutch 69 disposed between the gear box 40 and the bearing 45 for forcing the meat through the head 65. The clutch is operated by a suitable handle 70 for selectively engaging the shaft 71 of the grinder with the gear box 40. Thus, after the meat is sufficiently mixed in the drum 11, the grinder may be operated to further grind the meat and deliver it to the pan 66. During this operation, the paddle blades 47 tend to urge the meat downwardly to the opening 63. As discussed above, the paddle blades 50, 51, 53 and 54 tend to urge the meat toward the center of the drum and, thus, the operation of the mixing apparatus 10 at this time is one tending to urge the mixed meat into the grinder 64 until substantially the entire mass of ground meat M is delivered from the mixing chamber 15 into the grinder and thence after suitable grinding delivered to the collecting pan 66.

Referring now to FIGURE 6, a modified form of center paddle structure is shown to comprise a structure generally similar to that of FIGURE 1, but having the paddle blades 147 mounted at an angle to the bar 49 so as to be inclined downwardly toward the opening 63 as the paddle blades move past the opening. Thus, the paddle blades 147 provide an outward vectorial component of force as they move past the opening 63 to provide improved urging of the ground meat outwardly through the opening to the grinder. In all other respects, the functioning of the paddle structure of FIGURE 6 is similar to that of FIGURE 1.

Upon completion of a mixing and grinding operation, it is desirable to permit facilitated cleaning of the paddle structure. As discussed above, the shaft 18 effectively comprises a contractible shaft to permit such facilitated removal of the paddle structure. Thus, referring to FIGURES 3 and 4, in the normal arrangement the stub shaft 24 is connected to the drive shaft end 32 journalled in the bearing 20 to provide a rotational drive of the paddle structure 17. When it is desired to remove the paddle structure 17, the cotter pin 27 is removed and the stub shaft 24 slid inwardly into the socket 23 to disengage the stub shaft from the drive pin 30 in drive shaft end 32 permitting the paddle structure 17 to be withdrawn through the front opening 16.

Referring to FIGURE 7, a modified form of means for permitting contractibility of the shaft 18 is shown to comprise a lead spring 73 having one end 74 secured to the sleeve 22, an arcuate mid-portion 75, and an end portion 76 received in an exposed portion 77 of a key slot 78 in the stub shaft 24 defining a shoulder 79 against which the resiliency of the spring 73 biases the end portion 76. Thus, the spring normally urges the stub shaft 24 to the left to interlock the slot 29 thereof with the drive pin 30 for normal operation of the mixer. When it is desired to remove the paddle structure from the drum, the user merely pulls upwardly on the arcuate portion 75 of the spring 73 to disengage the end 76 from the shoulder 79 and permit the stub shaft to be telescoped into the socket 23 to provide the necessary contraction of the shaft for permitting removal of the paddle structure. In all other respects the paddle shaft structure of FIGURE 7 is similar to and functions similarly to that of FIGURE 1.

In the embodiments of FIGURE 1 and FIGURE 6 each paddle blade 47 and 147 has its lateral edges in a straight line substantially parallel to the axis of shaft 18. This causes the blades 47 and 147 to clear more meat from the center of the drum than if these edges were angled. This clearing of a large amount of meat from the center of the drum permits the side paddles 50, 51, 53 and 54 which are angled rearwardly to urge the meat from the ends of the drum into the cleared areas vacated by the paddle blades 47 and 147. Also, because of this parallel relationship, the center blades 47 and 147 push more meat into position over the opening in the bottom of the drum to facilitate passing of the meat through the opening 63 and into the grinder. The side paddles of course do not directly push the meat into the opening 63 but urge the meat into position to be acted upon by the center paddles and thus contribute to a mixing of the meat. The side paddles of course do take some meat with them which is stripped therefrom at the top of the drum as previously described, but they carry with them a smaller amount than do the center paddles 47 and 147.

While I have shown and described certain embodiments of my invention, it is to be underdstood that it is capable of many modifications. Changes, therefore, in the construction and arrangement may be made without departing from the spirit and scope of the invention as defined in the appended claims.

I claim:

1. Apparatus for mixing subdivided meat, comprising: a mixing chamber for retaining said meat during mixing, the chamber having a lower portion receiving said meat and an upper portion; a transverse rotatable shaft means in said chamber between said lower and upper portions; and a plurality of paddle means spaced along and mounted on said shaft means for rotation with the shaft means in laterally spaced paths in said chamber, said paths traversing said upper and lower portions during said rotation, each of a pair of said paddle means comprising a support bar on said shaft means transverse thereto and a long narrow blade on said support bar spaced from said shaft means and transverse to its support bar, each said long narrow blade being angled rearwardly with respect to the direction of said rotation and in the direction of the center of said chamber to urge said meat in the direction of said center during said rotation, said angled long narrow blades mixing the meat during said rotation by movement through said lower portion of the chamber to tumble the meat and to fold the meat by clearing a path through the meat into which path adjacent portions of the meat fall, a part of the meat being lifted into said upper portion of the chamber by said inclined blades and urged away from the blades in said direction of said center.

2. The apparatus of claim 1 wherein the angle of said blade to its said support bar is generally about 45°.

3. The apparatus of claim 1 wherein each said support bar is elongated, is attached at substantially its center to said shaft means with a said long narrow blade at each end of said bar.

4. The apparatus of claim 1 wherein said mixing chamber lower portion has means forming an outlet opening receiving meat from said rotating paddle means and a power driven meat grinder having a housing receiving meat through said opening.

5. The apparatus of claim 4 wherein there are provided power means for selectively driving said mixing shaft means and said grinder.

6. The apparatus of claim 1 wherein said mixing chamber has means forming a pair of opposite ends with said shaft means extending therebetween, one of said pair of paddle means is located adjacent one said end, another of said paddle means is located adjacent the other said end, and each said blade extends away from its said adjacent end of the chamber.

7. The apparatus of claim 6 wherein said paddle means includes an intermediate paddle means rotatable therewith in a path between said ends, and said mixing chamber lower portion has means forming an outlet opening adjacent said intermediate paddle means to receive meat therefrom.

8. The apparatus of claim 7 wherein said intermediate paddle means comprises a blade movable adjacent said opening and inclined toward the opening to push meat therethrough.

9. The apparatus of claim 7 wherein said mixing chamber lower portion has means forming an outlet opening receiving meat from said rotating paddle means, a power driven meat grinder having a housing receiving meat through said opening, and power means for selectively driving said mixing shaft means and said grinder.

10. The apparatus of claim 1 wherein said shaft means comprises a plurality of relatively contractable parts for permitting contracting the shaft means to provide removal thereof with said paddle means from said chamber as for cleaning.

11. Apparatus for mixing subdivided meat, comprising: a mixing chamber for retaining said meat during mixing, the chamber having a lower portion and an upper portion; a rotatable shaft means in said chamber above said lower portion; a plurality of spaced paddle means on said shaft rotatable in spaced paths in said chamber, each said paddle means comprising a blade movable through said lower portion of the chamber and of a narrow width to clear a path through the meat during said mixing, at least one blade being inclined to its direction of movement to simultaneously urge the meat toward another of said plurality of paddle means during said mixing; and a stripper member in said upper portion of the chamber for stripping meat from each said paddle means.

12. The apparatus of claim 11 wherein a pair of adjacent stripper members for a pair of adjacent blades are integral.

13. Apparatus for mixing subdivided meat, comprising: a mixing chamber for retaining said meat during mixing, the chamber having a lower portion and an upper portion; a rotatable shaft means in said chamber above said lower portion; and a plurality of spaced paddle means on said shaft rotatable in spaced paths in said chamber, each said paddle means comprising a blade movable through said lower portion of the chamber and of a narrow width to clear a path through the meat during said mixing, at least one blade being inclined to its direction of movement to simultaneously urge the meat toward another of said plurality of paddle means during said mixing, said mixing chamber has means forming a pair of opposite ends with said shaft means extending therebetween, one of said paddle means is located adjacent one said end, another of said paddle means is located adjacent the other said end, and each said end paddle means comprises a support bar rotatable with said shaft means and a paddle blade extending from its support bar and inclined rearwardly to its direction of movement and away from its said adjacent end of the chamber, said shaft means is provided with an intermediate paddle means rotatable therewith in a path between said ends, and said mixing chamber lower portion has means forming an outlet opening adjacent said intermediate paddle means to receive meat therefrom, said intermediate paddle means has a pair of opposite end portions, there are provided a first stripper member for stripping meat from a said end paddling means, a second stripper member for stripping meat from an adjacent said end portion, a third stripper member for stripping meat from the other said end paddle means, and a fourth stripper member for stripping meat from the said intermediate paddle means end portion that is adjacent said other end paddle means.

14. The apparatus of claim 13 wherein said shaft means is substantially horizontal and said stripper members are located above said shaft means for causing stripped meat to fall back onto the shaft means.

15. The apparatus of claim 13 wherein said first and second stripper members are integral, and said third and fourth stripper members are integral.

References Cited

UNITED STATES PATENTS

| | | | |
|---|---|---|---|
| 488,098 | 12/1892 | Tritz | 259—45 |
| 2,692,714 | 10/1954 | Goldberg | 259—45 X |
| 3,251,579 | 5/1966 | Lasar | 259—46 |
| 3,346,239 | 10/1967 | Larson | 259—45 X |

ROBERT W. JENKINS, Primary Examiner

U.S. Cl. X.R.

146—182